(12) United States Patent
Hummel et al.

(10) Patent No.: US 9,283,732 B2
(45) Date of Patent: Mar. 15, 2016

(54) GYPSUM PLASTER BOARD AND A METHOD FOR PRODUCING A GYPSUM PLASTER BOARD

(75) Inventors: Hans-Ulrich Hummel, Iphofen (DE); Lothar Scheller, Iphofen (DE); Dietmar Stich, Willanzheim (DE)

(73) Assignee: Knauf Gips KG, Iphofen (DE)

( * ) Notice: Subject to any disclaimer, the term of this patent is extended or adjusted under 35 U.S.C. 154(b) by 0 days.

(21) Appl. No.: 13/577,681

(22) PCT Filed: Feb. 8, 2011

(86) PCT No.: PCT/EP2011/051801
§ 371 (c)(1),
(2), (4) Date: Aug. 8, 2012

(87) PCT Pub. No.: WO2011/095634
PCT Pub. Date: Aug. 11, 2011

(65) Prior Publication Data
US 2012/0305162 A1   Dec. 6, 2012

(30) Foreign Application Priority Data

Feb. 8, 2010 (EP) .................................... 10152909

(51) Int. Cl.
| | | |
|---|---|---|
| *C04B 11/00* | (2006.01) | |
| *B32B 13/00* | (2006.01) | |
| *C04B 14/02* | (2006.01) | |
| *C04B 28/14* | (2006.01) | |
| *E04C 2/04* | (2006.01) | |
| *C04B 111/00* | (2006.01) | |

(52) U.S. Cl.
CPC ............... *B32B 13/00* (2013.01); *C04B 14/024* (2013.01); *C04B 28/14* (2013.01); *E04C 2/043* (2013.01); *C04B 2111/0062* (2013.01)

(58) Field of Classification Search
CPC .. B28B 19/0092; C04B 14/024; C04B 28/14; C04B 35/536; C04B 2111/94; C04B 2111/00465
USPC ..................................... 156/45; 106/680, 784
See application file for complete search history.

(56) References Cited

U.S. PATENT DOCUMENTS

| | | | |
|---|---|---|---|
| 4,009,062 A | | 2/1977 | Long |
| 4,645,548 A | * | 2/1987 | Take et al. ........................ 156/39 |
| 2004/0099362 A1 | | 5/2004 | Martin et al. |
| 2007/0031701 A1 | | 2/2007 | Nakashima et al. |
| 2007/0031704 A1 | * | 2/2007 | Guckert et al. ............... 428/703 |
| 2008/0060871 A1 | * | 3/2008 | Englert et al. ................. 181/294 |
| 2008/0200086 A1 | * | 8/2008 | Porter et al. .................... 156/42 |

FOREIGN PATENT DOCUMENTS

| | | |
|---|---|---|
| CN | 1276354 | 12/2000 |
| CN | 1907905 | 2/2007 |
| EP | 1749805 | 2/2007 |
| JP | 06-279087 | 10/1994 |
| JP | 2004-521852 | 7/2004 |
| JP | 2007-039328 | 2/2007 |
| JP | 2007-153637 | 6/2007 |
| WO | WO-2006/016200 A1 | 2/2006 |

OTHER PUBLICATIONS

Australian Examination Report dated Aug. 26, 2013.
Notice of Reasons for Rejection dated Jul. 29, 2014.
Chinese Office Action dated Mar. 30, 2015, and English Translation of Chinese Office Action.

* cited by examiner

*Primary Examiner* — Timothy Kennedy
(74) *Attorney, Agent, or Firm* — Venable LLP; Keith G. Haddaway; Annette K. Kwok

(57) ABSTRACT

Gypsum plaster board, containing a gypsum matrix and 0.1 to 10% by weight carbon particles, wherein the particle size (d50) of the carbon particles ranges from 0.5 to 4 mm.

13 Claims, No Drawings

GYPSUM PLASTER BOARD AND A METHOD FOR PRODUCING A GYPSUM PLASTER BOARD

The present invention relates to a gypsum plaster board and to a process for preparing a gypsum plaster board.

The preparation of gypsum plaster boards has long been known. For example, it is described in U.S. Pat. No. 4,009,062. In a usual method, a gypsum slurry containing a settable calcium sulfate phase is mixed with water and continuously applied to a cardboard sheet and covered by a second cardboard. The two cardboard sheets are referred to as the top liner and back liner, respectively.

The composite strand then moves on a so-called setting belt, and an almost complete conversion of the settable calcium sulfate phases in the calcium sulfate dihydrate must have taken place at the end of the setting belt. After this curing, the sheet is cut into individual boards and the water still contained in the boards is removed in heated multistage dryers.

The settable gypsum slurry employed is typically produced in a continuous mixer having a high number of revolutions.

For a board to be stable, it is necessary that the cardboard surrounding the board is firmly bonded to the gypsum core, and that the gypsum core has a high strength.

Corresponding gypsum plaster boards are extensively used in interior finish for ceilings and walls.

The skilled person also knows so-called perforated boards. In perforated boards, apertures, such as circles, slots, rectangles etc., are punched out by means of punching machines. Such perforated boards are usually employed in ceiling constructions, because the thus obtained ceilings exhibit a high degree of sound absorption. For this purpose, perforated boards are usually mounted onto a suitable substrate construction, typically of zinc-plated steel profiles.

For the punching, it is necessary that the board core has a high interior strength and is virtually free of air inclusions. In addition, a good adhesion of the top and back liners to the gypsum core must be ensured.

In principle, gypsum plaster boards should be screwed as easily as possible, but must show no or only a slight sag in profile, especially when mounted on the ceiling. This is problematic, in particular, if the boards are used in rooms with a high atmospheric moisture.

Different variants of gypsum plaster boards are known; for example, WO 2006/016200 discloses a gypsum matrix containing from 1 to 5% amorphous carbon and from 15 to 25% graphite in the gypsum matrix. Because of the fraction of amorphous carbon, especially in the form of nanoparticles, the cardboard is electrically conductive.

It is the object of the present invention to provide gypsum plaster boards that have improved properties, especially boards having a high strength of the gypsum core and exhibiting a good adhesion of the cardboard, because sag problems can be reduced or avoided thereby.

Surprisingly, the object can be achieved by a gypsum plaster board containing a gypsum matrix and from 0.1 to 10% by weight of carbon particles, wherein the particle size (d50) of the carbon particles is within a range of from 0.5 to 4 mm.

"Gypsum matrix" refers to a gypsum core essentially consisting of calcium sulfate dihydrate that may contain further ingredients. As a gypsum plaster board, the board also has two cardboard layers on its major surfaces.

d50 is the particle size for which 50% by weight of all carbon particles contained in the matrix will pass through a sieve of a corresponding size, and 50% by weight are retained.

Surprisingly, it has been found that the carbon particles are homogeneously distributed in the gypsum core, and there is no or only a little floating to the top of the light particles in the gypsum slurry despite of their low density. The carbon particles contained result in an improvement of the gypsum core stability. Because they do not float to the top, a negative influence on the adhesion to the cardboard surprisingly is not found.

In a preferred embodiment, the content of carbon particles is within a range of from 5 to 8% by weight, based on the dry gypsum core.

In particular, graphite is suitable as carbon particles. For example, scraps of graphite foil, expandable graphite or mixtures thereof are suitable.

Scraps of graphite foil are obtainable, for example, from the company Graphit Kropfmühl AG under the product designation O-SM/F. These are foils pressed from graphite and subsequently cut. A suitable d50 value is from 2 to 4 mm.

For example, the product EGPM of the company Graphit Kropfmühl AG can be used as expandable graphite. Expandable graphite is a material that will expand under the action of heat; the final volume can be several times the starting volume.

According to the invention, the expandable graphite is preferably employed in expanded form.

In a preferred embodiment, different carbon particles are combined. Preferably, at least two different, more preferably at least three different, carbon particles are employed. In particular, a mixture of scraps of graphite foil and expandable graphite, or a combination of scraps of graphite foil or of a mixture of scraps of graphite foil and expandable graphite with artificial amorphous graphite or natural graphite have proven suitable.

For example, the product AM385 of the company Graphit Kropfmühl AG can be employed as amorphous graphite powder. Typical sizes are, for example, <325 μm for 91.5% by weight of the powder.

For example, the product FLP 90 C2-SC of the company Kropfmühl can be employed as natural graphite.

Typical amounts of the scraps of foil are within a range of from 1 to 4.5% by weight, and from 1 to 3% by weight for each of the other particles.

If amorphous graphite (artificial or natural) is contained, a particulate graphite is additionally contained.

In one embodiment of the invention, the gypsum matrix additionally contains from 1 to 10% by weight of calcium carbonate. Calcium carbonate causes the screwing property to improve.

In one embodiment of the invention, the boards are employed in the form of perforated boards, i.e., after having been prepared, they are provided with slots, perforations in the form of circles, squares or rectangles by punching.

Surprisingly, it is found that the boards according to the invention have a particularly good screwing property, because they have a strong gypsum core and yet show a very good adhesion of the cardboard.

Even in rooms with a high atmospheric moisture, the boards according to the invention show only a little sag. When tested at 20° C. and 90% relative humidity, the boards showed a sag of less than 3 mm in the machine direction and less than 5 mm in the cross-machine direction.

The boards according to the invention show a good core hardness. It is preferably more than 150 N, more preferably more than 165 N. Their thermal conductivity is preferably >0.4 W/mK or >0.45 W/mK, i.e., increased over that of a normal board.

Despite the presence of carbon particles, especially graphite, the boards are electrically non-conductive, i.e., the resistance of the dry board is >500 MΩ at an applied line voltage of 500 V or 1000 V. However, they have a high thermal conductivity.

The invention also relates to a process for preparing the gypsum plaster board according to the invention, comprising the following steps:

preparing a settable gypsum slurry containing from 0.1 to 10% by weight of carbon particles, wherein the particle size (d50) of the carbon particles is within a range of from 0.5 to 4 mm;
applying said gypsum slurry to a cardboard sheet;
covering the slurry with a second cardboard sheet;
cutting the cardboard sheet into boards after the gypsum slurry has at least partially set.

In one embodiment, the board is perforated after the setting to obtain a perforated board.

In another embodiment, from 1 to 10% by weight of calcium carbonate can be added to the gypsum slurry, the use of finely ground calcium carbonate having been found particularly useful. Preferably, the grain size of the calcium carbonate employed is <300 μm.

Water and plaster of Paris ($CaSO_4 \times 0.5H_2O$) are particularly suitable for preparing the gypsum slurry. The gypsum slurry can be admixed with further auxiliaries, especially plasticizers, in order to keep the ratio of water to gypsum low.

The invention is further illustrated by the following Examples.

EXAMPLE 1

Determination of the Core Hardness

From a gypsum board, a 300 mm wide strip is cut at 40° C. over the width of the board, and laid on a steel plate with 10 mm thickness and a bore. A sharpened steel nail 40 mm long and 2.1 to 2.4 mm thick is pushed through the board from the top side to the back side at a velocity of 200 mm per minute until it comes out of the back side of the board. The maximum occurring resistance is stated, wherein a mean value over at least six measuring points of the board is stated.

EXAMPLE 2

Sag Test

For a sag test, a 12.5 mm thick board is cautiously cut into several lengthwise and crosswise strips sized 100*670 mm using a precision circular saw. The specimens are dried at 40° C. to constant weight while they rested on the lengthwise cutting edge. The specimens are laid on a specimen stack with a gap of 600 mm, and the sag is measured with a precision of 0.01 mm (starting sag). Subsequently, the specimens are stored in a climatic test cabinet at 20° C.±1° C. and 90%±1% relative humidity on a stage with a distance of 60 mm area between the bearings with the top side down for 7 days. The sag in obtained from the subsequently measured sag minus the starting sag.

EXAMPLE 3

A gypsum slurry with the following composition was prepared:

| | |
|---|---|
| 127.55 g | plaster of Paris |
| 90.00 g | water |
| 0.45 g | plasticizer |
| 10.00 g | $CaCO_3$ |
| 7.50 g | scraps of graphite foil O/SMF |
| 1.50 g | expandable graphite EGMP |
| 3 g | FLP graphite |

These were applied to the cardboard sheet in the usual way and covered by a cardboard sheet. After curing, the following values were obtained:

| | |
|---|---|
| Nominal thickness: | 10 mm |
| Weight per unit area: | 10.40 kg/m² at 40° C. |
| Bulk density: | 1049 kg/m³ |
| Equilibrium moisture content: | 0.11% |
| Breaking loads according to EN 520 at 40° C.: | 0 636 N SS lengthwise<br>0 272 N RS crosswise |
| Spec. flexural strengths according to EN 520 at 40° C.: | 0 11.36 SS lengthwise<br>0 4.83 RS crosswise |
| Modulus of elasticity according to EN 520 at 40° C.: | 0 6843 N/mm² SS lengthwise<br>0 5091 N/mm² RS crosswise |
| Sag test at 20° C./90%: | 2.82 mm in machine direction<br>4.04 mm in cross-machine direction |
| Relative humidity: | |
| Core hardness/Ametek: | 0 176N |
| Thermal conductivity: | 0 0.47 W/mK |
| Electric conductivity: | Insulator (>500M Ω at 500 V, according to VDE) |

The invention claimed is:

1. A gypsum plaster board comprising:
a gypsum matrix and
from 0.1 to 10% by weight of carbon particles, wherein the particle size (d50) of the carbon particles is within a range of from 0.5 to 4 mm, and wherein said carbon particles are at least two different carbon particles selected from the group consisting of scraps of graphite foil, expanded graphite in expanded form, amorphous graphite, and natural graphite, and wherein the gypsum matrix additionally contains from 1 to 10% by weight of calcium carbonate with a particle size less than 300 μm.

2. The gypsum plaster board according to claim 1, wherein the content of carbon particles is within a range of from 5 to 8% by weight.

3. The gypsum plaster board according to claim 1 wherein the particle size of the carbon particles (d50) of the carbon particles is within a range of from 1 to 3 mm.

4. The gypsum plaster board according to claim 1, wherein said board is stamped.

5. A process for preparing a gypsum plaster board according to claim 1, comprising the following steps:
preparing a settable gypsum slurry containing from 0.1 to 10% by weight of carbon particles, wherein the particle size (d50) of the carbon particles is within a range of from 0.5 to 4 mm, and wherein said carbon particles are at least two different carbon particles selected from the group consisting of scraps of graphite foil, expanded graphite in expanded form, amorphous graphite, and natural graphite, and wherein the settable gypsum slurry further contains from 1 to 10% by weight of calcium carbonate with a particle size less than 300 μm;
applying said gypsum slurry to a cardboard sheet;
covering the slurry with a second cardboard sheet;
cutting the cardboard sheet into boards after the gypsum slurry has at least partially set.

6. The process for preparing a gypsum plaster board according to claim 5, wherein one or two of the cardboard sheets employed consist of conductive cardboard.

7. The process according to claim 5, wherein said board is perforated after the setting to obtain a perforated board.

8. The process according claim 5, wherein water and plaster of Paris are used for preparing said gypsum slurry.

9. The process according to claim 5, wherein auxiliaries are added.

10. The process according to claim 9, wherein the auxiliaries are plasticizers.

11. The gypsum plaster board of claim 1, wherein the gypsum plaster board has an electrical resistance of 500 MΩ at 1000 V.

12. The gypsum plaster board of claim 1, wherein the gypsum plaster board has a sag in the machine direction of less than 3 mm.

13. The gypsum plaster board of claim 1, wherein the gypsum plaster board has a sag in the cross-machine direction of less than 5 mm.

* * * * *